(12) United States Patent
Woody

(10) Patent No.: US 10,744,929 B2
(45) Date of Patent: Aug. 18, 2020

(54) POSITION TUNING PLATFORM

(71) Applicant: VOLKSWAGEN AG, Wolfsburg (DE)

(72) Inventor: Davis Maxwell Woody, Chattanooga, TN (US)

(73) Assignee: VOLKSWAGEN AG (DE)

( * ) Notice: Subject to any disclaimer, the term of this patent is extended or adjusted under 35 U.S.C. 154(b) by 93 days.

(21) Appl. No.: 16/038,353

(22) Filed: Jul. 18, 2018

(65) Prior Publication Data

US 2020/0023768 A1 Jan. 23, 2020

(51) Int. Cl.
*B60Q 1/26* (2006.01)
*B60Q 1/30* (2006.01)

(52) U.S. Cl.
CPC .............. *B60Q 1/2642* (2013.01); *B60Q 1/30* (2013.01)

(58) Field of Classification Search
None
See application file for complete search history.

(56) References Cited

U.S. PATENT DOCUMENTS

| | | | |
|---|---|---|---|
| 5,785,376 A * | 7/1998 | Nees | B60J 5/0444 |
| | | | 296/146.6 |
| 5,815,992 A | 10/1998 | Wells et al. | |
| 9,809,091 B2 | 11/2017 | Benson | |
| 10,336,166 B2 * | 7/2019 | Kwak | B60J 5/0437 |
| 2007/0170751 A1 * | 7/2007 | Tanaka | B60J 5/0429 |
| | | | 296/146.6 |
| 2009/0026795 A1 * | 1/2009 | Tate | B60J 5/0429 |
| | | | 296/146.6 |
| 2012/0091750 A1 * | 4/2012 | Danaj | B60J 5/0437 |
| | | | 296/146.6 |
| 2017/0072775 A1 * | 3/2017 | Kindaichi | B60J 5/0443 |
| 2019/0337393 A1 * | 11/2019 | Von Novak, III | H02J 7/025 |

FOREIGN PATENT DOCUMENTS

KR 0180407 B1 4/1999
KR 20020083269 A 11/2002

* cited by examiner

*Primary Examiner* — Elmito Breval
(74) *Attorney, Agent, or Firm* — Barnes & Thornburg LLP

(57) ABSTRACT

Devices, systems, and methodologies for transportation vehicle fit-up can include a tuning assembly for tuning the spatial relationship between an accessory and adjacent portions of the transportation vehicle.

18 Claims, 7 Drawing Sheets

POSITION TUNING PLATFORM

BACKGROUND

The present disclosure relates to systems, components, and methodologies for adaptive tuning. In particular, the present disclosure relates to systems, components, and methodologies for adaptive tuning for positioning.

SUMMARY

According to another aspect of the present disclosure, a transportation vehicle may include a vehicle body; a vehicle accessory for mounting onto the vehicle body, the vehicle accessory including a housing having at least one mounting location for defining a spatial relationship of the housing relative to portions of the vehicle body; and spacing means for tuning the spatial relationship between the housing and the portions of the transportation vehicle.

In some embodiments, the spacing means may include a number of tuning surfaces for receiving selective application of a tuning pad to define the spatial relationship. The number of tuning surfaces may include at least one tuning surface having a first predetermined height relative to a reference point of the housing, and at least one tuning surface having a second predetermined height relative to the reference point, greater than the first predetermined height. In some embodiments, at least two tuning surfaces of the number of tuning surfaces may be arranged to have the second predetermined height.

In some embodiments, the spacing means may be arranged on the at least one mounting location. In some embodiments, each tuning surface may be formed by a tuning platform having a ramped section increasing in height approaching the tuning surface. The ramped section may be joined with the tuning surface by a transition section formed as a filet.

In some embodiments, the tuning surface of each tuning platform may be proximate to an exterior edge of the housing and the ramped section extends away from the tuning surface in an installation direction of the housing mounting onto the vehicle body. Each tuning platform may extend parallel to an installation direction of the housing mounting onto the vehicle body.

According to another aspect of the present disclosure a vehicle accessory for a transportation vehicle may include an accessory housing for attachment to the transportation vehicle. The accessory housing may include at least one mounting location for defining a spatial relationship of the accessory housing relative to portions of the transportation vehicle. The vehicle accessory may include a tuning assembly for tuning the spatial relationship between the housing and the portions of the transportation vehicle. The tuning assembly may include a number of tuning platforms disposed at the at least one mounting location for receiving selective application of a tuning pad to define the spatial relationship.

In some embodiments, each tuning platform may include a tuning surface for selective engagement with the tuning pad to define the spatial relationship. The tuning surface of at least one platform of the number of tuning platforms may be arranged to have a first predetermined height relative to a reference point of the accessory housing. The tuning surface of at least one other platform of the number of tuning platforms may be arranged to have a second predetermined height relative to the reference point, greater than the first predetermined height.

In some embodiments, the tuning surfaces of at least two platforms of the number of tuning platforms are arranged to have the second predetermined height. The tuning surfaces of the at least two platforms may be adjacent each other.

In some embodiments, each tuning platform may include a ramped section increasing in height approaching the tuning surface. The ramped section may be joined with the tuning surface by a transition section formed as a filet. The tuning surface of each tuning platform may be proximate to an exterior edge of the accessory housing and the ramped section may extend away from the tuning surface in an installation direction of the accessory housing mounting onto the transportation vehicle. Each tuning platform may extend parallel to an installation direction of the accessory housing mounting onto the transportation vehicle. Each tuning platform is spaced apart from the other tuning platforms.

According to another aspect of the present disclosure, a vehicle lamp assembly may include a vehicle lamp having a light source; a housing including a cavity defined at least partly therein for receiving the light source, the housing including at least one mounting location for defining a spatial relationship of the housing relative to portions of the vehicle; and spacing means for tuning the spatial relationship between the housing and the portions of the vehicle.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

In transportation vehicle assembly, proper fit-up of component parts can contribute to a desirable overall aesthetic. Fit-up can include spacing, alignment, and/or other fine coordinated arrangement between those component parts. Moreover, improper fit-up of component parts can invite undesirable contact between parts, which can cause undue wear, noise and/or vibration, and/or other physical damage. Yet, assuring proper fit-up can be challenging from a design and/or assembly standpoint.

Figure 1:
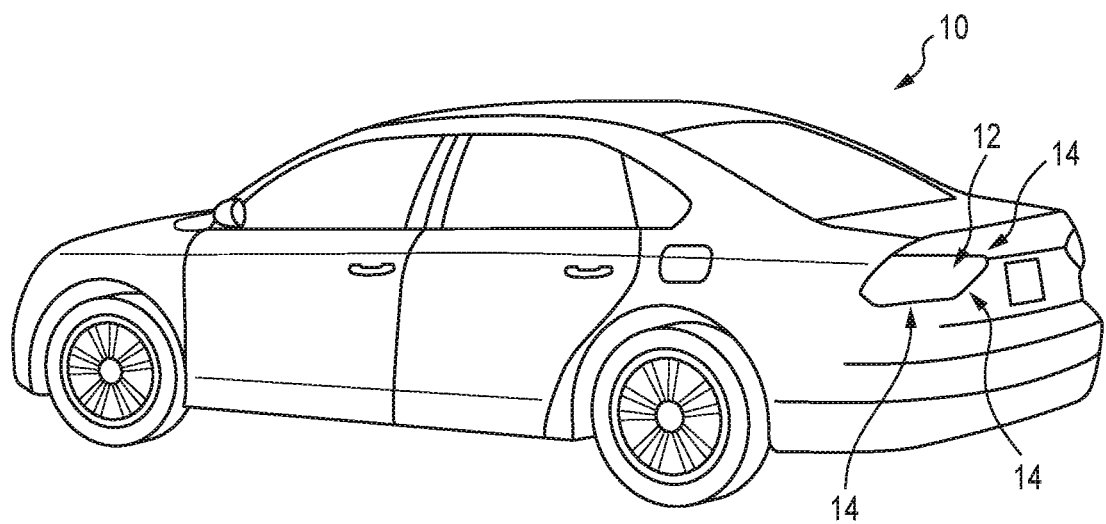
FIG. 1 is a perspective view of a transportation vehicle including an accessory tail lamp having a tunable assembly for tuning the fit-up of the lamp.

Referring to FIG. 1, a transportation vehicle is shown as a typical passenger vehicle 10. In the illustrative embodiment, the vehicle 10 may have a gas combustion engine coupled by a drive train to drive the wheels, but in some embodiments, may include any suitable drive configuration, such as alternative fuels and/or power, hybrid electric, full electric, etc. As an exemplary accessory, the vehicle 10 may include a tail lamp assembly 12 adapted for tunable positioning to define its spacing from other portions 14 of the vehicle 10.

Figure 2:
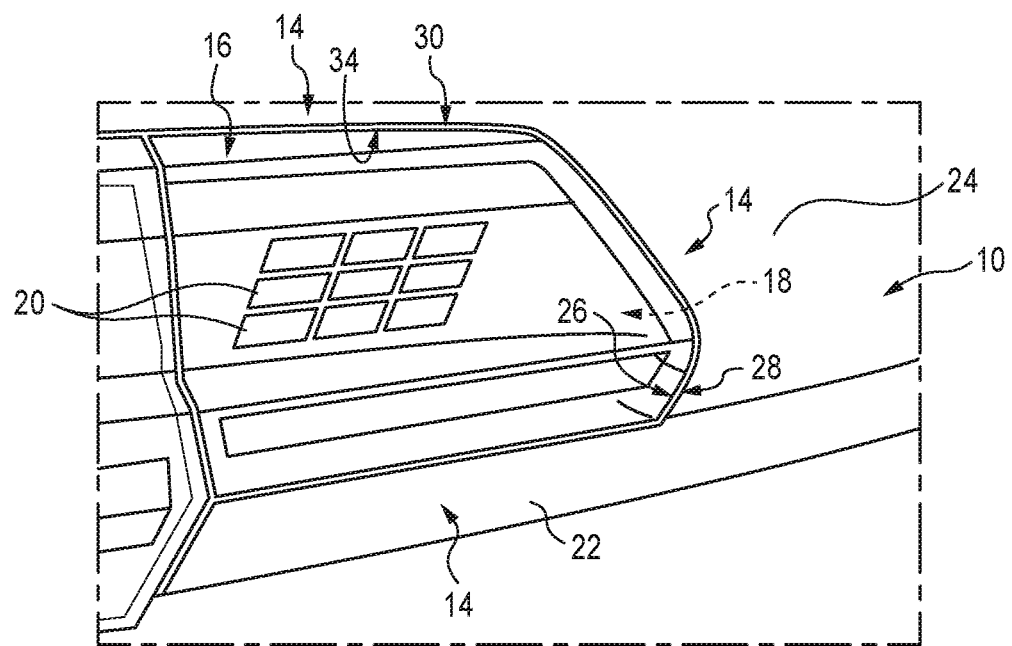
FIG. 2 is a closer perspective view of the tail lamp showing that a lamp housing is spaced apart from other adjacent portions of the vehicle with gaps.

As shown in FIG. 2, the tail lamp assembly 12 may include a housing 16 installed onto the vehicle 10. As the present exemplary accessory is a tail lamp, the housing 16 may be formed to have a generally have a transparent exterior and to define an interior cavity 18. Within the cavity 18, a number of lamps (light sources) 20 may be arranged to signal vehicle operation through the transparent exterior.

Other portions 14 of the vehicle 10 may be positioned immediately adjacent to the housing 16 in the installed position. Those portions 14 may include trim 22, body parts 24 (e.g., bumper, quarter panel, trunk, etc.), and/or other exterior components of the vehicle 10. Gaps 28, 30 may be defined between the housing 16 and the other portions 14. As discussed in additional detail below, the gap 28 is shown by example at the lower corner 26 while the gap 30 is shown at the upper edge 34 of the housing 16.

Figure 3:
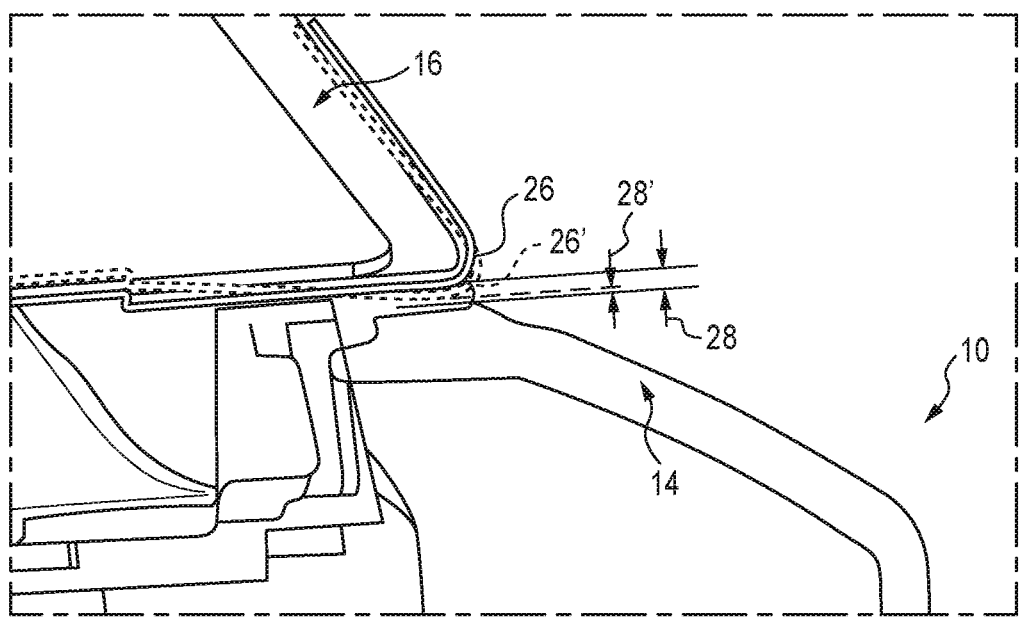
FIG. 3 is a diagrammatic view of the tail lamp to illustrate first and second spacing positions of the bottom corner of the tail lamp, one position (solid line) being an acceptable spacing, and another position (broken line) having an undesirably small spacing from other portions of the vehicle.

As shown in the diagram of FIG. 3, an improper fit-up defines the gap 28' to be undesirably small. With the gap 28' being outside the acceptable tolerance values, the aesthetics and/or performance of the accessory can be reduced. Tuning the fit-up to define the gap 28, properly within the acceptable tolerances, can achieve desirable aesthetics and/or performance of the accessory. In some embodiments, for certain accessories, acceptable tolerances may be, for example, within ±5 mm (0.20 inches), but in other embodiments, may be within ±7 mm (0.28 inches). Similar spacing issues can exist along any portion of the exterior edges of the housing 16, for example, the upper edge 34. As discussed below, the spacing issues of gap 28 are addressed relative to gap 30.

Figure 4:
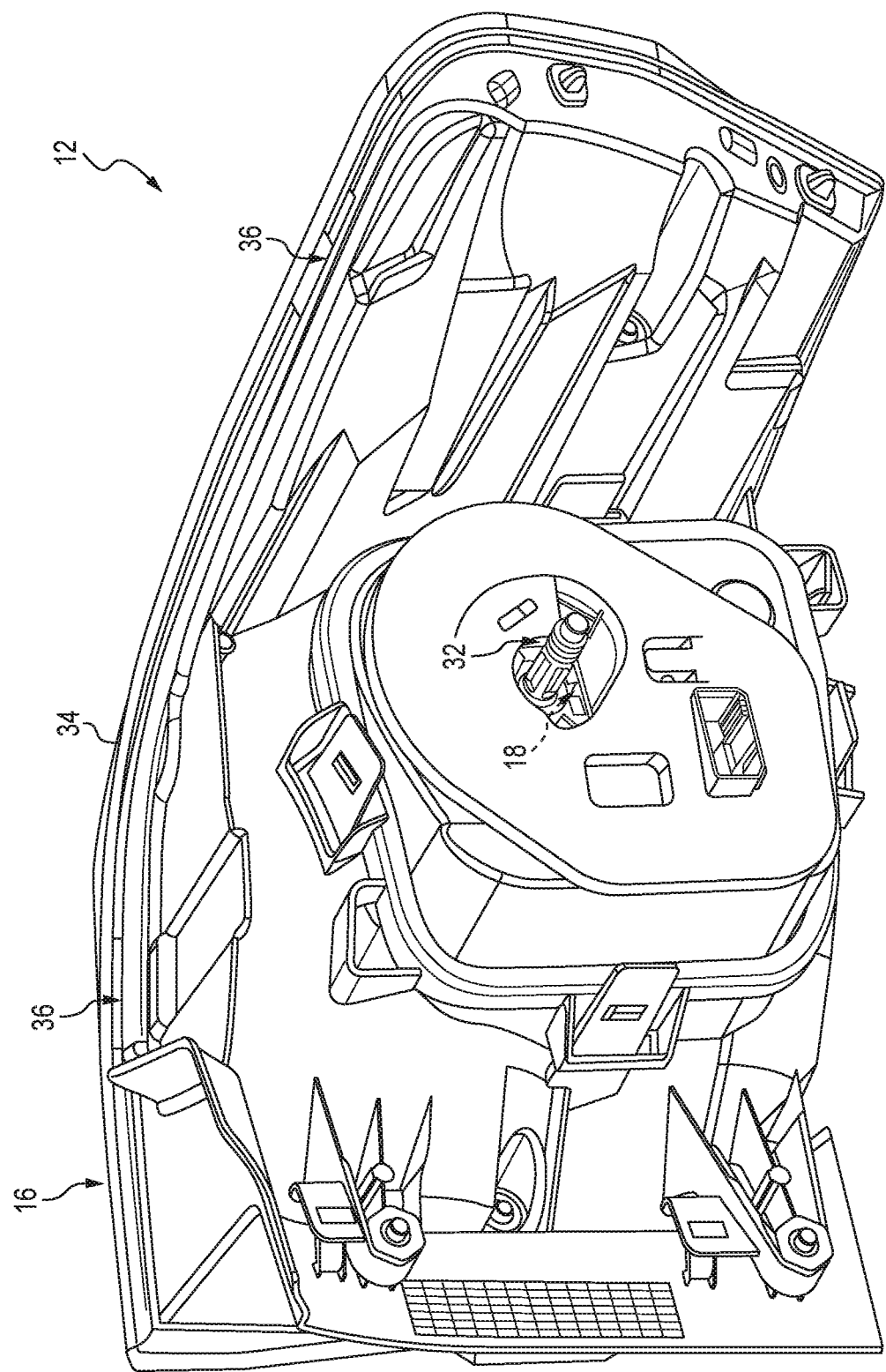
FIG. 4 is a perspective view of a rear (interior) side of the tail lamp showing that a number of mounting locations are disposed along the upper edge.

Referring now to FIG. 4, an interior side of the tail lamp assembly 12 is shown. The interior side may be adapted for connection with the body of the vehicle 10. The electrical connection 30 is shown for the lamps 20, and may extend from the cavity 18 for connection with the vehicle wiring. A pair of mounting locations 36 may be disposed along the upper edge 34 of the housing 16 for allowing fine adjustment of the spacing (gap 30) of the housing 16 from the other portions 14.

Figure 5:
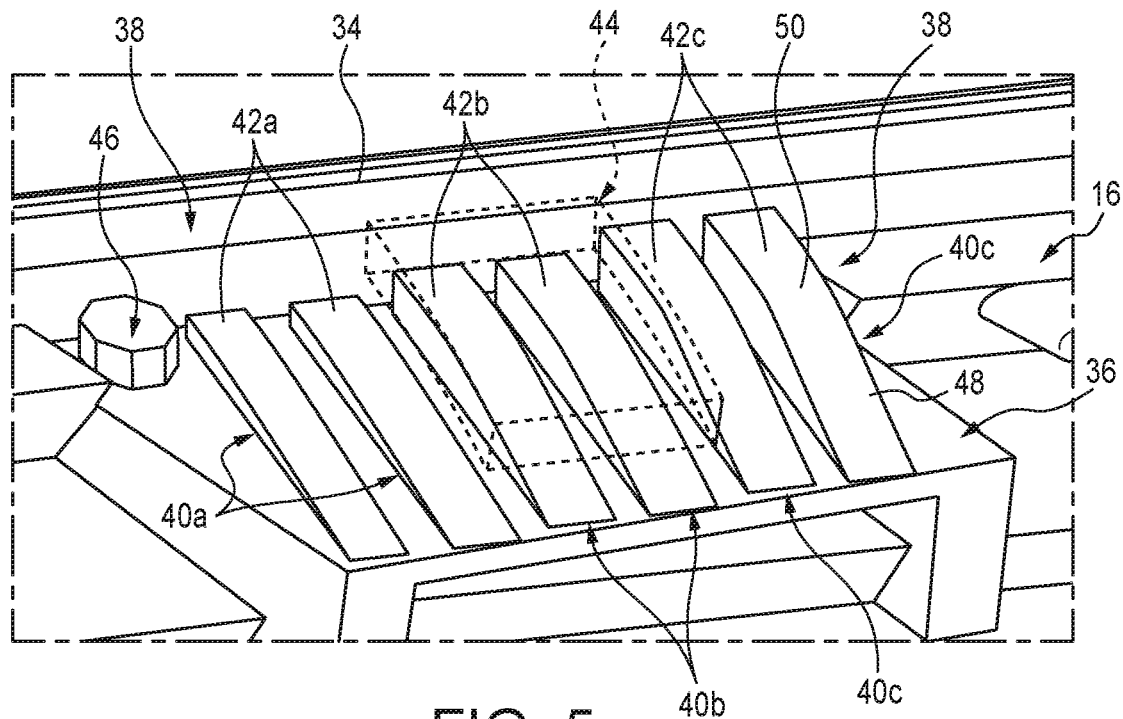
FIG. 5 is a perspective view of a tunable assembly of the tail lamp showing that the tunable assembly is arranged on the mounting locations for tuning the spatial relationship of the lamp housing from other portions of the vehicle by selective application of a tuning pad.

As shown in FIG. 5, a tuning assembly 38 may be disposed at each of the mounting locations 36 for precisely defining the gap 30. The tuning assembly 38 may include tuning platforms 40 (represented as 40a, 40b, 40c). The tuning platforms 40 may each define a tuning surface 42 (represented as 42a, 42b, 42c, respectively) and may be disposed for receiving selective application of a tuning pad 44 to define the spatial relationship of the housing 16 from the other portions 14 along the edge 34.

The tuning platforms 40 may include adjacent pairs of tuning platforms 40a, 40b, 40c. Each pair of tuning platforms 40a, 40b, 40c may define a predetermined height of its tuning surface 42a, 42b, 42c relative to the reference surface 46. In the illustrative embodiment, the predetermined height of the tuning surfaces 42b may be equal to the height of the reference surface 46 (i.e., the surfaces 42b and 46 may lie within the same plane), the predetermined height of the tuning surfaces 42a may be slightly less than the height of the reference surface 46, and the predetermined of the tuning surfaces 42c may be slightly greater than the height of the reference surface 46. Selectively applying the tuning pad 44 to the different pairs of tuning surfaces 42 provides a different height of the tuning pad 44 for engagement with the other portions 14 of the vehicle 10. Although the present example includes mounting locations 36 along the upper edge 34 of the accessory, the term predetermined "height" is not limiting as to upward directional spacing and merely indicates relative distance from the reference surface 46. Accordingly, by selectively applying the tuning pad 44 to the tuning surfaces 42 of a select pair of tuning platforms 40, the position of the tuning pad 44 for defining the spatial relationship of the housing 16 relative to the other portions 14 can be tuned. By allowing tuning without materially modifying the components and/or requiring customized fit pads, the fit-up can be quickly and easily adjusted to acceptable tolerances.

The tuning pad 44 may provide a resilient contact area for engagement with contact areas of the other portions 14 of the vehicle 10 to define the spatial relationship, for example, the gap 30. The tuning pad 44 may be formed to include a resilient material, such as natural rubber, silicone, and/or any other material suitable for vibration resilience and/or reduction. As previously mentioned, the tuning pad 44 can be arranged on a selected pair of the tuning platforms 40 to define the spatial relationship.

Figure 6:
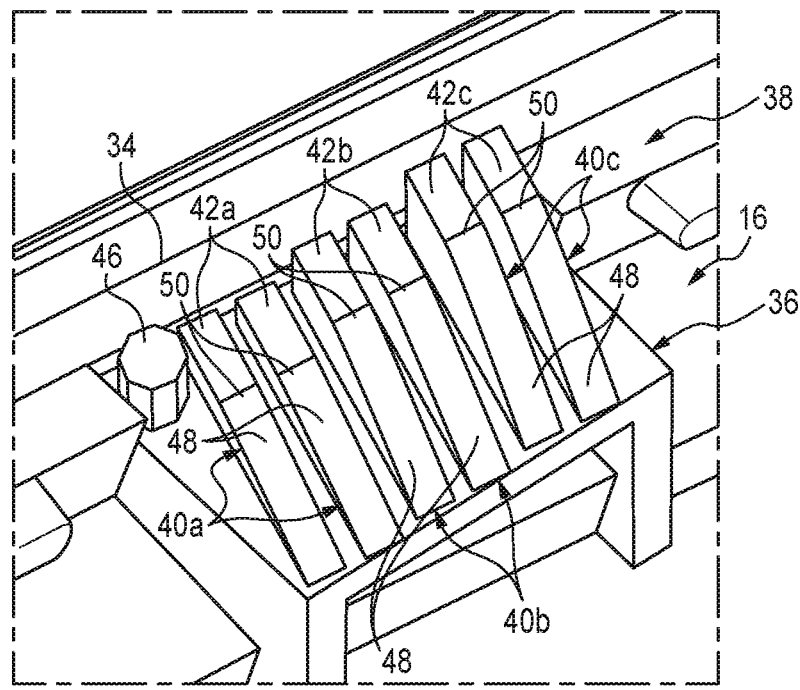
FIG. 6 is a perspective view of the tuning assembly of FIG. 5, showing that the tuning assembly includes three pairs of tuning platforms, each pair having a defined height relative to a reference surface, such that selective application of the tuning pad to the different pairs of tuning platforms provides a tunable spatial relationship of the housing with the other portions of the vehicle.

Referring now to FIG. 6, each tuning platform 40 may be arranged to position its tuning surface 42 near the (exterior) upper edge 34. Each tuning platform 40 may include a ramped section 48 that extends away from the corresponding tuning surface 42 opposite the upper edge 34. The ramped sections 48 may have increasing height approaching the corresponding tuning surface 42. The ramped sections 48 can reduce the likelihood of undesirable contact of the tuning platforms 40 with other portions of the vehicle 10 during installation of the accessory tail lamp, as discussed in additional detail below.

Figure 7:
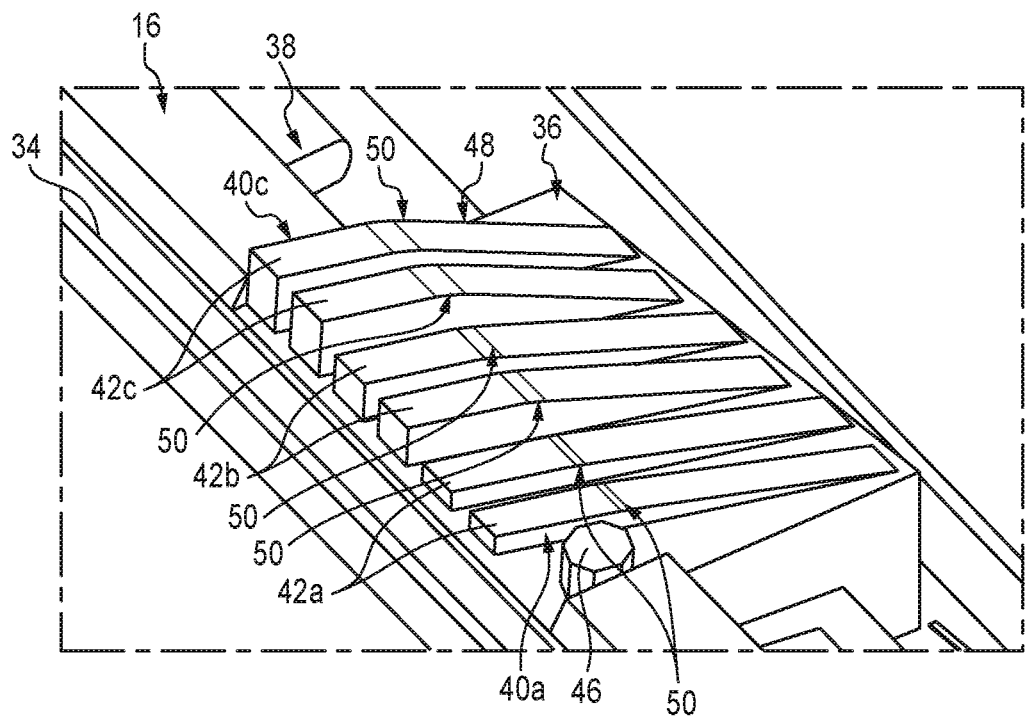
FIG. 7 is a perspective view of the tuning assembly of FIGS. 5 and 6, showing that from the tuning surfaces each tuning platform includes a transition section and a ramped section extending away from the upper edge.

Referring to FIG. 7, each ramped section 48 may include a transition section 50 for easing the change in contour between the ramped section 48 and the tuning surface 42. The transition section 50 can encourage desirable contact between the tuning platform 40 and the tuning pad 44 while reducing damage to pad 44 with repeated loading. In the illustrative embodiment, the transition section 50 includes a radius of curvature of about 3 mm (about 0.12 inches), but in some embodiments may have a radius of curvature within the range of about 1 mm to about 10 mm (about 0.04 to about 0.4 inches). The difference in the predetermined heights of the tuning surfaces 42a, 42b, 42c to allow selective tuning of the spatial relationship is distinctly observable in FIGS. 7-10.

Figure 8:
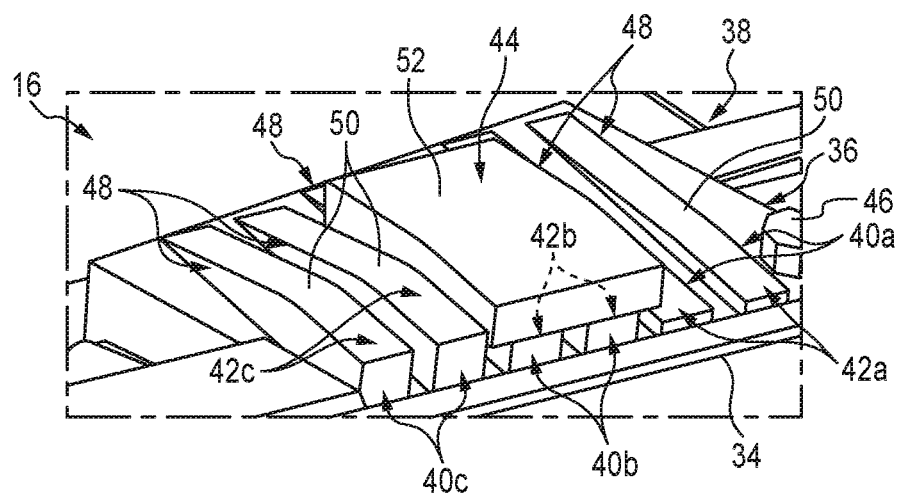
FIGS. 8-10 are perspective views of the tuning pad applied to the various different pair of tuning platforms.

As shown in FIG. 8, the tuning pad 44 may be applied to the tuning platforms 40b. As previously mentioned, the tuning platforms 40b may include tuning surfaces 42b which have a height equal to the reference surface 46. The tuning pad 44 may be applied to the tuning surfaces 42b and may extend across the transition section 50 of the tuning platforms 40b and at least partially onto the ramped sections 48 of the tuning platforms 40b. The tuning pad 44 may include an engagement surface 52 disposed on an opposite side from its engagement with the tuning platforms 40b. The engagement surface 52 may generally conform with the curvature of the tuning surfaces 42b, the transition section 50 of the tuning platforms 40b, and the ramped section 48 of the tuning platforms 40b, when applied to the tuning platforms 40b. Accordingly, when applied to the platforms 40b, the height of the tallest part of the engagement surface 52 is equal to the height of the reference surface 46 plus the thickness of the tuning pad 44. More specifically, relative to the tuning surfaces 42b, the portions of the engagement surface 52 lying over the transition section 50 and ramped section 48 may be lower than the portions of the engagement surface 52 lying over the tuning surfaces 42b (when the pad 44 is applied to the tuning platforms 40b).

Figure 9:
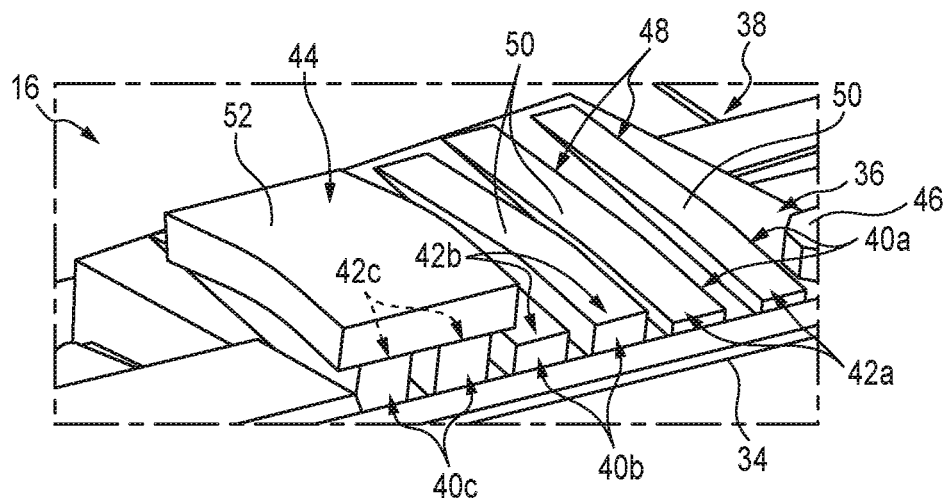

As shown in FIG. 9, the tuning pad 44 may be applied to the tuning platforms 40c. As previously mentioned, the tuning platforms 40c may include tuning surfaces 42c which may be slightly greater in height than the reference surface 46. The tuning pad 44 may be applied to the tuning surfaces 42c and may extend across the transition section 50 of the tuning platforms 40c and at least partially onto the ramped sections 48 of the tuning platforms 40c. Accordingly, when applied to the platforms 40c, the height of the tallest part of the engagement surface 52 is slightly higher than the height of the reference surface 46 plus the thickness of the tuning pad 44. The engagement surface 52 of the tuning pad 44 may generally conform with the curvature of the tuning surfaces 42c, the transition section 50 of the tuning platforms 40c, and the ramped section 48 of the tuning platforms 40c, when applied to the tuning platforms 40c. More specifically, relative to the tuning surfaces 42c, the portions of the engagement surface 52 lying over the transition section 50 and ramped section 48 may be lower than the portions of the engagement surface 52 lying over the tuning surfaces 42c (when the pad 44 is applied to the tuning platforms 40c).

Figure 10:
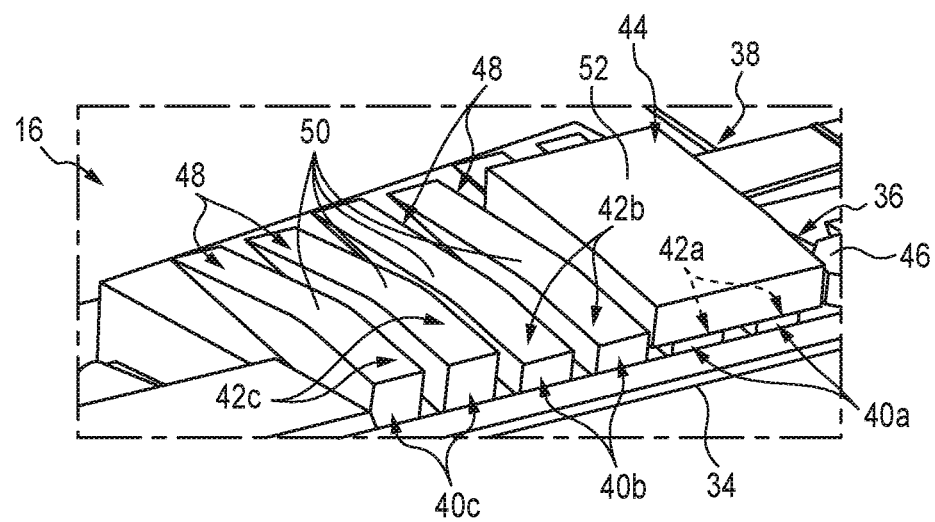

As shown in FIG. 10, the tuning pad 44 may be applied to the tuning platforms 40a. As previously mentioned, the tuning platforms 40a may include tuning surfaces 42a which may be slightly lower in height than the reference surface 46. The tuning pad 44 may be applied to the tuning surfaces 42a and may extend across the transition section 50 of the tuning platforms 40a and at least partially onto the ramped sections 48 of the tuning platforms 40a. Accordingly, when applied to the platforms 40a, the height of the tallest part of the engagement surface 52 is slightly lower than the height of the reference surface 46 plus the thickness of the tuning pad 44. The engagement surface 52 of the tuning pad 44 may generally conform with the curvature of the tuning surfaces 42a, the transition section 50 of the tuning platforms 40a, and the ramped section 48 of the tuning platforms 40a, when applied to the tuning platforms 40a. More specifically, relative to the tuning surfaces 42a, the portions of the engagement surface 52 lying over the transition section 50 and ramped section 48 may be lower than the portions of the engagement surface 52 lying over the tuning surfaces 42a (when the pad 44 is applied to the tuning platforms 40a).

Figure 11:
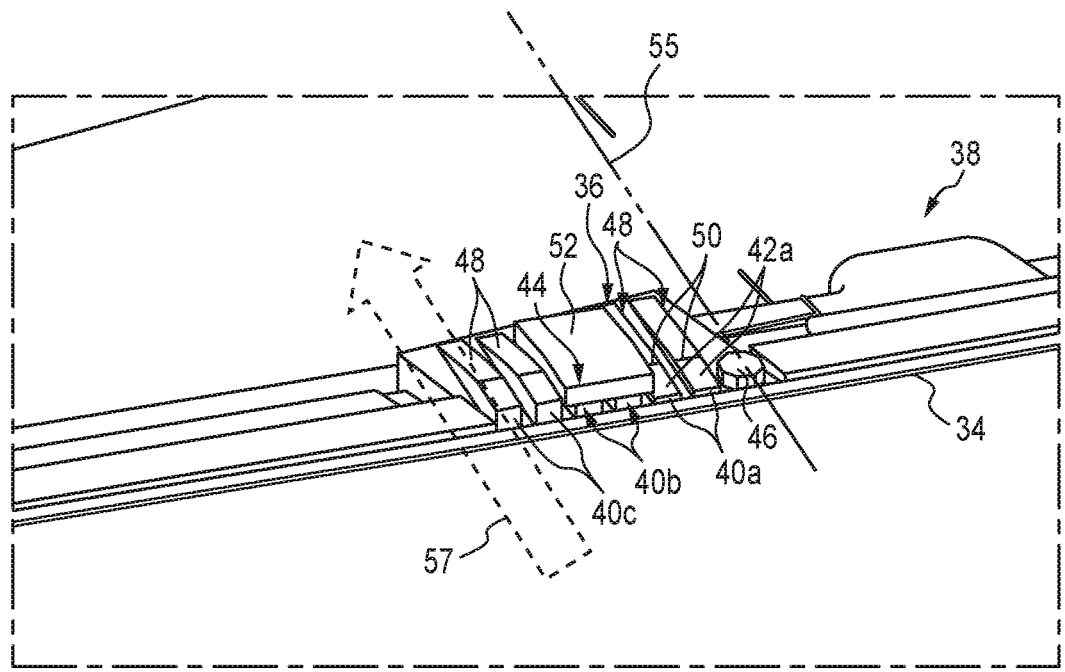
FIG. 11 is a perspective view of the tuning assembly showing that the tuning platforms extend away from the upper edge parallel to an installation direction.

Referring now to FIG. 11, an alignment line 55 is shown indicating a direction relative to the upper edge 34. The tuning platforms 40 may extend away from the upper edge 34 parallel to the alignment line 55. The direction of the alignment line 55 may correspond with the installation direction which is indicated by arrow 57 such that the tuning platforms 40 extend along the installation direction 57 away from the upper edge 34. Namely, the transition and ramped sections 50, 48 may extend away from the corresponding tuning surface 42 in a direction parallel with the installation direction. The tapered shape of the tuning platforms 40 likewise may correspond to the installation direction 57 to reduce the likelihood of damage during installation. Moreover, as an applied tuning pad 44 conforms generally with the curvature of the tuning platforms 40 to which it is applied, the engagement surface 52 of the tuning pad 44 may likewise correspond with the installation direction 57.

During real-world installation, the tail lamp assembly 14 may be rocked or tilted into final engagement, by first engaging a lower edge of the housing 16 with the vehicle 10 and then tilting the upper edge 34 into its final position along the installation direction 57. By aligning the extension of the tuning platforms 40 (and the applied tuning pad 44) with the installation direction 57, the likelihood of damage to the tuning platforms 40 (and/or pad 44, and/or other portions 14) during installation can be reduced. In the illustrative embodiment, the alignment line 55 is non-perpendicular to the edge 34 near the mounting location 36, but in some embodiments, the alignment line 55 may have any suitable position relative to the relevant exterior edge of the housing 16.

Figure 12:
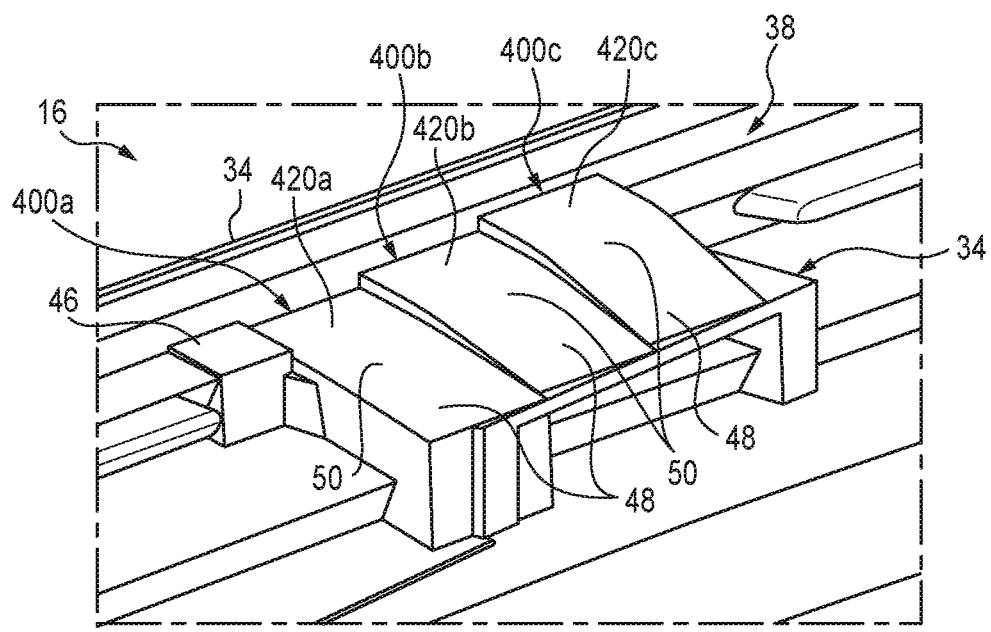
FIG. 12 is a perspective view of another embodiment of the tuning platforms of the tuning assembly of FIGS. 5-11 showing that a single platform receive the tunable pad.

Another illustrative embodiment of tuning platforms 400 of the tuning assembly 38 is shown in FIG. 12. The tuning platforms 400 may include tuning platforms 400a, 400b, 400c and defining respective tuning surfaces 420a, 420b, 420c. Like the tuning platforms 40, the tuning surfaces 420 are respectively equal to (420b), slightly greater than (420c) and slightly less than (420a) the height of the reference surface 46. Also like the tuning platforms 40, the tuning platforms 400 have transition and ramped sections 50, 48 extending away from their corresponding tuning surface 420 in an installation direction. However, unlike the tuning platforms 40, the tuning platforms 400 are single platforms having wider surfaces for engagement with the tuning pad.

The present disclosure includes devices, systems, and methods for adaptive tuning surfaces for vehicle accessory fit-up. Stack-up or the combined tolerances from different vehicle parts can result in misalignment which effects visual and/or physical matching of components. For example, the problem of fine tuning the fit-up for visual continuity can require highly customized parts, such as customized tuning pads to allow the installer to perform trial-and-error fit-up. The time and/or cost for individual fit-up of component parts can exceed reasonable thresholds. For example, making available customized sizes of contact pads can be cumbersome. Technical solutions to these problems can be realized by providing a predetermined tuning system can reduce and/or eliminate the needs for customized parts.

The tuning pads of the present disclosure are illustratively embodied to have a thickness of within the range of about 1.4 to about 1.6 mm (about 0.055 to about 0.063 inches), but in some embodiments may be within the range of about 1 to about 5 mm (about 0.39 to about 0.20 inches). The difference in height between the various tuning surfaces a, b, c is embodied to be about 0.5 mm (0.20 inches) such that tuning surfaces 42a, 420a are about 0.5 mm lower than 42b, 420b which are about 0.5 mm lower than tuning surfaces 42c, 420c, but in some embodiments, the difference may be within the range of about 0.1 to about 1 mm (about 0.04 to 0.39 inches), and the difference between surfaces 42a, 420a and 42b, 420b, may be different from the difference between surfaces 42b, 420b and 42c, 420c. Just as the spacing issues described as to the corner 26 and addressed as to the upper edge 34 have been described, the mounting locations and tuning assemblies of the present disclosure may be applied to any portion of the exterior of the accessory to provide suitable spatial relationships as desired.

Disclosed embodiments may be implemented in conjunction with components of autonomous driving systems and driver assistance systems included in automotive vehicles. Thus, the utility of the disclosed embodiments within those technical contexts is described in detail. However, the scope of the innovative concepts disclosed herein is not limited to those technical contexts. Therefore, it should be understood that the disclosed embodiments provide utility in all aspects of image processing and control, analysis and diagnostic systems utilizing image processing. Illustrative embodiments providing a pair of equally spaced tuning surfaces can reduce the likelihood of sinks or depressions in the applied tuning pad.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

We claim:

1. A transportation vehicle comprising:
   a vehicle body;
   a vehicle accessory for mounting onto the vehicle body, the vehicle accessory including a housing having at least one mounting location for defining a spatial relationship of the housing relative to portions of the vehicle body; and
   a tuning assembly configured to tune the spatial relationship between the housing and the portions of the transportation vehicle, the tuning assembly including a plurality of tuning surfaces for receiving selective application of a tuning pad to define the spatial relationship, the tuning surfaces including at least first and second predetermined heights relative to a reference point of the housing.

2. The transportation vehicle of claim 1, wherein the plurality of tuning surfaces include at least one tuning surface having a first predetermined height relative to a reference point of the housing, and at least one tuning surface having a second predetermined height is greater than the first predetermined height.

3. The transportation vehicle of claim 2, wherein at least two tuning surfaces of the plurality of tuning surfaces are arranged to have the second predetermined height.

4. The transportation vehicle of claim 1, wherein the tuning assembly is arranged on the at least one mounting location.

5. The transportation vehicle of claim 1, wherein each tuning surface is formed by a tuning platform having a ramped section increasing in height approaching the tuning surface.

6. The transportation vehicle of claim 5, wherein the ramped section is joined with the tuning surface by a transition section formed as a filet.

7. The transportation vehicle of claim 6, wherein the tuning surface of each tuning platform is proximate to an exterior edge of the housing and the ramped section extends away from the tuning surface in an installation direction of the housing mounting onto the vehicle body.

8. The transportation vehicle of claim 1, wherein each tuning platform extends parallel to an installation direction of the housing mounting onto the vehicle body.

9. A vehicle accessory for a transportation vehicle, comprising:
   an accessory housing for attachment to the transportation vehicle, the accessory housing including at least one mounting location for defining a spatial relationship of the accessory housing relative to portions of the transportation vehicle; and
   a tuning assembly for tuning the spatial relationship between the housing and the portions of the transportation vehicle, the tuning assembly including a plurality of tuning platforms disposed at the at least one mounting location for receiving selective application of a tuning pad to define the spatial relationship, each tuning platform including a tuning surface for selective engagement with the tuning pad to define the spatial relationship, wherein the tuning surface of at least one platform of the plurality of tuning platforms is arranged to have a first predetermined height relative to a reference point of the accessory housing, and wherein the tuning surface of at least one other platform of the number of tuning platforms is arranged to have a second predetermined height relative to the reference point.

10. The vehicle accessory of claim 9, the second predetermined height is greater than the first predetermined height.

11. The vehicle accessory of claim 10, wherein the tuning surfaces of at least two platforms of the plurality of tuning platforms are arranged to have the second predetermined height.

12. The vehicle accessory of claim 11, wherein the tuning surfaces of the at least two platforms are adjacent to each other.

13. The vehicle accessory of claim 9, wherein each tuning platform includes a ramped section increasing in height approaching the tuning surface.

14. The vehicle accessory of claim 13, wherein the ramped section is joined with the tuning surface by a transition section formed as a filet.

15. The vehicle accessory of claim 14, wherein the tuning surface of each tuning platform is proximate to an exterior edge of the accessory housing and the ramped section extends away from the tuning surface in an installation direction of the accessory housing mounting onto the transportation vehicle.

16. The vehicle accessory of claim 9, wherein each tuning platform extends parallel to an installation direction of the accessory housing mounting onto the transportation vehicle.

17. The vehicle accessory of claim 9, wherein each tuning platform is spaced apart from the other tuning platforms.

18. A vehicle lamp assembly comprising:
   a vehicle lamp having a light source;
   a housing including a cavity defined at least partly therein for receiving the light source, the housing including at least one mounting location for defining a spatial relationship of the housing relative to portions of the vehicle; and
   a tuning assembly for tuning the spatial relationship between the housing and the portions of the vehicle, the tuning assembly including a number of tuning surfaces for receiving selective application of a tuning pad to define the spatial relationship, the tuning surfaces including at least first and second predetermined heights relative to a reference point of the housing.

* * * * *